United States Patent Office 3,580,818
Patented May 25, 1971

3,580,818
SEA WATER MULTISTAGE DISTILLATION PROCESS WITH COMMON REHEATING MEANS
Rocco Catoggio de Villiers, Brooklyn Pretoria, Transvaal, Republic of South Africa, and Loic Blachez, Paris, Francois Jegou, Bourg-la-Reine, and Jean Huyghe and Paul Vignet, Grenoble, France, assignors to Commissariat a l'Energie Atomique, Paris, France
Filed Mar. 11, 1969, Ser. No. 806,078
Claims priority, application France, Mar. 18, 1968, 144,284
Int. Cl. B01d 3/06
U.S. Cl. 203—11
5 Claims

ABSTRACT OF THE DISCLOSURE

A method and installation for the distillation of a solution to be treated in a plurality of lines. In each line, the solution is reheated in the liquid state, then caused to expand in a series of stages at progressively decreasing pressures consisting of stages for recovery at higher pressure and stages for heat rejection at lower pressure, and the vapor produced at each stage is caused to condense. Condensation is produced at least in the recovery stages by exchange with the feed solution as this latter is circulated from one stage to the next prior to reheating and in counterflow to the reheated solution. The feed solution of each line consists of the non-vaporized brine of the preceding line as completed by a make-up quantity of fresh solution. Reheating is carried out either at temperatures which decrease progressively from one line to the next as a function of the increase in the concentration of a salt having reverse solubility in the reheated solution or at temperatures which increase progressively from one line to the next as a function of the increase in the concentration of a salt having normal solubility in the reheated solution.

---

The present invention is concerned with flash distillation process (distillation by successive expansions) for the treatment of a solution containing either a salt having reverse solubility or a salt having normal solubility and applicable especially to the desalination of sea water. The invention is also directed to an installation for the application of said process.

Flash distillation is frequently employed, not only in order to recover a solvent from a saline solution for such purposes as production of fresh water by desalination of sea water but also in order to concentrate liquors in the chemical or food industry, for example.

The method consists in heating a solution to be treated in the liquid state, causing the expansion of the preheated solution in a series of stages at progressively decreasing pressures and in causing the condensation of the vapor produced at each stage.

In the majority of cases, condensation takes place by exchange with the feed solution prior to heating as this latter circulates from one stage to the other countercurrent to the heated solution.

The concentration of the non-vaporized brine which is obtained by means of this process is often too low to permit only a single passage through a series of stages at progressively decreasing pressures. This is particularly true when the process is employed for the treatment of a costly solution and more especially for the treatment of sea water which has previously undergone pretreatment for reducing scale formation as a result of a reduction in concentration of some salts such as the carbonates and more especially calcium carbonate.

A first improvement which has been made in these processes with a view to overcoming the disadvantages mentioned above consists, in the example of desalination of sea water, in recycling a part of the non-vaporized brine in the feed solution which causes the condensation of the vapor.

Accordingly, the series of stages which constitute the distillation line usually comprises so-called heat recovery stages at a higher pressure in which the condensation is caused by the feed solution and in which recycling is carried out with a make-up quantity of pretreated sea water, and so-called heat-rejection stages at a lower pressure in which the condensation is caused by exchange with cold non-pretreated sea water from which the make-up quantity is withdrawn.

This cycle of distillation by successive expansions with recycling offers the advantage of reducing the quantity of sea water to be pretreated and therefore of reducing the cost of pretreatment. On the other hand, the higher concentration of the feed solution makes it necessary to reduce the temperature of heating of the sea water, as is not the case with the process in which recycling is not employed. In fact, sea water contains in particular calcium sulphate whose solubility decreases when the temperature rises and which would be liable to form a deposit even if its concentration had been reduced by pretreatment. The same problem would arise in the case of any other saline solution containing a salt having reverse solubility.

The present invention is directed to the basic concept of a method of distillation by successive expansions as applicable in particular to the treatment of a solution containing a salt which has reverse solubility and to the treatment of solutions containing a salt having normal solubility. By means of this method, it is now possible to overcome the disadvantages referred-to above while combining the advantages of distillation by direct-cycle expansion (especially simplicity, minimum concentration of the solution at the heating level, reduced extraction work) with the advantages of distillation by expansion with recycling (in particular a lower rate of feed of solution in respect of a given production of solvent and low cost of pretreatment) and at the same time avoiding any risk of scale formation at the level of the hottest stages.

The method according to the invention is essentially characterized in that it comprises the distillation of a solution to be treated in a plurality of lines each comprising reheating the solution in the liquid state, causing the expansion of the preheated solution in a series of stages at progressively decreasing pressures consisting of stages for recovery at higher pressure and stages for heat rejection at lower pressure, and causing condensation of the vapor produced at each stage, said condensation being caused at least in the recovery stages by exchange with the feed solution prior to reheating as said solution circulates from one stage to the next countercurrent to the reheated solution and that the feed solution of each line consists of the non-vaporized brine of the preceding line as completed by a make-up quantity of fresh solution and either that the reheating takes place at temperatures which decrease progressively from one line to the next as a function of the increase in the concentration of a salt having reverse solubility in the reheated solution or that the reheating takes place at temperatures which increase progressively from one line to the next as a function of the increase in the concentration of a salt having normal solubility in the reheated solution.

In accordance with a secondary property of the invention, the process comprises the pretreatment of the make-up quantity of solution of each line in order to reduce the concentration of some salts in said make-up quantity and the condensation in the heat-rejection stages preferably takes place by exchange with the non-pretreated fresh solution from which said make-up quantity is withdrawn.

The invention is also directed to a distillation plant for carrying out the flash distillation process as defined in the foregoing or any like method, said installation being essentially characterized in that it comprises a plurality of lines each constituted by a series of vaporization chambers respectively associated with condensers for condensing the vapor produced in the corresponding chamber and in each line successively means for circulating a feed solution in series in at least a part of said condensers, means for reheating said solution and means for circulating the reheated solution within said vaporization chambers countercurrent to the flow within the condensers and at progressively decreasing pressures in order to cause the partial vaporization of said solution within each chamber, and means for returning the non-vaporized brine into the feed solution of the following line.

The method and installation in accordance with the invention appear to be particularly well suited to coupling with a thermal power plant for the production of electricity. In fact, since the heating of feed solutions of each line takes place at progressively increasing or decreasing temperatures as the case may be, it appears to be particularly profitable to carry out the reheating process either by exchange with a hot fluid which circulates in series from one line to the next or by exchange with vapor withdrawn from a same turbine at different pressures and either increasing or decreasing from one line to the next according to the nature of the solution.

A better understanding of the invention will be gained from the following description of one particular mode of execution of the method of distillation as well as two examples of construction of the installation in accordance with the invention. This description will be more specifically concerned with one application of the invention to the desalination of sea water for the production of fresh water. However, it is to be understood that this application is considered solely by way of example and does not imply any limitation of the invention.

Reference will be made to the accompanying drawings, in which:

FIG. 1 is a diagrammatic representation of the installation described hereinafter;

FIG. 2 relates to an alternative embodiment wihch differs from FIG. 1 in the method of reheating of the sea water;

Figure 1:
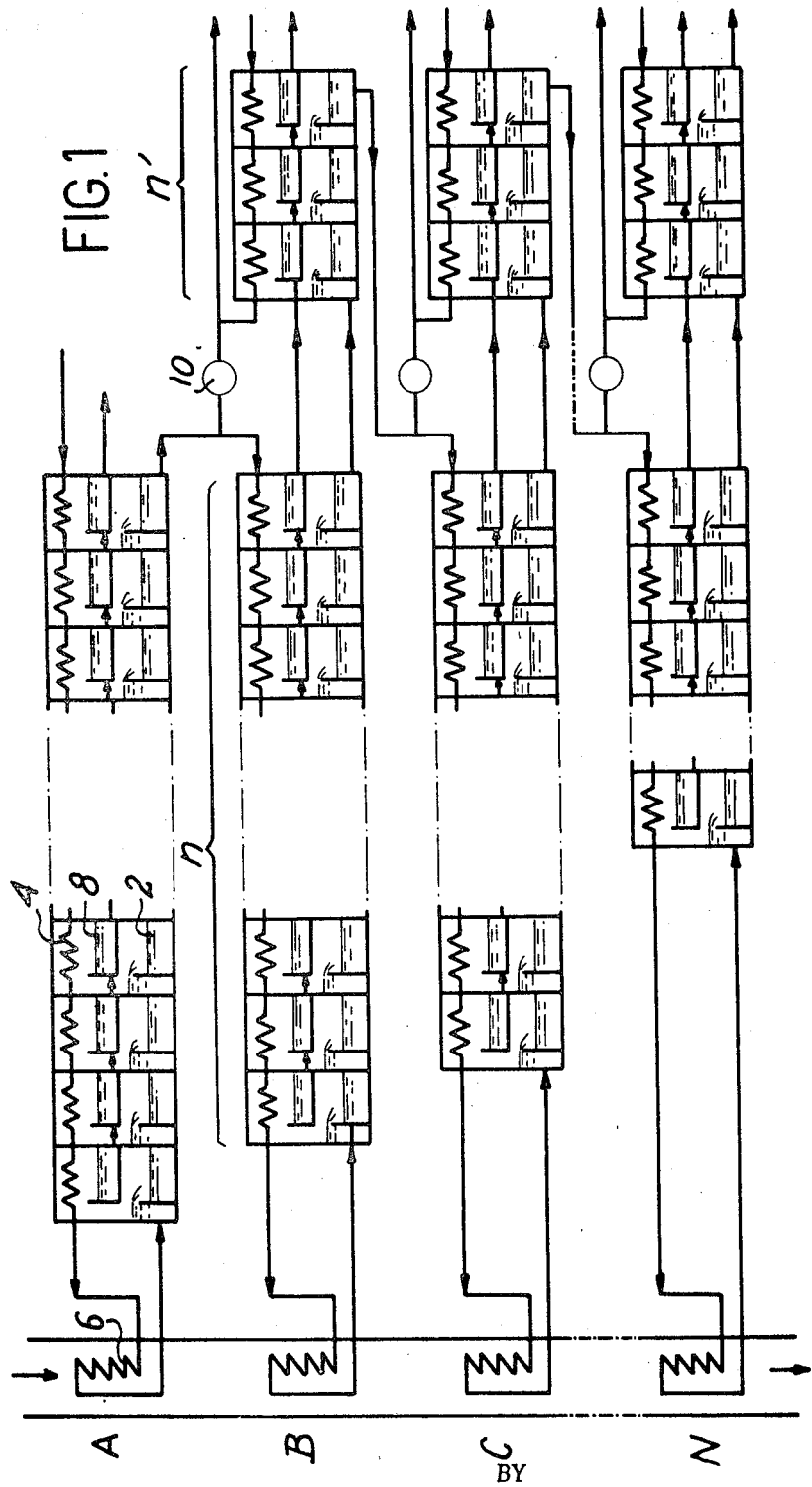
FIG. 1 illustrates by way of example a desalination plant consisting of four expansion lines A, B, C, N each comprising a series of stages for distillation by successive expansions.

In each stage, the sea water which flows from the previous stage is admitted into a vaporization chamber 2 in which it is partially vaporized. There is associated with each vaporization chamber a condenser 4 in which the vapor produced is caused to condense as fresh water; the condenser is formed in the upper portion of the vaporization chamber by tubes through which the feed solution (cold sea water) is circulated.

In each line, the sea water which is preheated by exchange with the vapor which condenses in the successive stages is reheated in a heater 6 at a pressure which is higher than the vapor pressure so as to prevent boiling. The sea water which is thus reheated in the liquid state flows through the series of vaporization chambers which are maintained at progressively decreasing pressures.

The cold sea water is circulated within the condensers 4 countercurrent to the reheated sea water within the vaporization chambers.

A fraction of the water evaporates within each chamber as a result of expansion and the vapor condenses in contact with the tubes of the condenser. The fresh water which is produced is collected in a trough 8, flows from one stage to the other and is finally collected at the outlet of the last stage of the line.

In the first line A, the feed solution which is circulated in series through all the condensers consists of cold sea water which may have been pretreated if necessary. Pretreatment is carried out in accordance with any conventional method such as acidification or addition of a deposit inhibitor so as to prevent any deposition of carbonates.

In the line B and similarly in the lines C . . . N, the expansion stages are divided into $n$ stages for the recovery of heat at higher pressure and $n'$ stages for the rejection of heat at lower pressure.

The reheated sea water is caused to expand in series within all of said stages. On the other hand, in order to remove the heat introduced by the heater, cold non-pretreated sea water is circulated within the tubes of the condensers of the heat-rejection stages whilst the feed solution which circulates within the tubes of the condenser of the recovery stages prior to being reheated consists mostly of the non-vaporized brine which is derived from the preceding line (in this case line A).

In order to compensate for the production of fresh water of the preceding line, the concentrated brine which is supplied to each line B, C . . . N receives a make-up quantity of sea water which may or may not have been pretreated. This quantity is taken from the sea water which circulates within the condensers of the heat rejection stages at the outlet of the first of said stages and may be subjected to a pretreatment at 10.

If, as in the particular case herein described, all the vaporization chambers are identical (with the result in particular that the temperature differences between one stage and the next are practically identical), the number of stages per line decreases from one line to the next (FIG. 1). By way of example, in the case of reheating by exchange of sensible heat, the installation can comprise ten lines and the total number of stages per line varies every line by 2 stages, thereby decreasing from 40 stages in the first line to 20 stages in the tenth line.

The installation of FIG. 1 is coupled with an electric power station which utilizes a gas turbine (not shown in the drawings). The hot gas of the gas-turbine cycle is employed for the purpose of reheating the sea water in the desalination plant. Thus, the gas is circulated successively within the heaters of the different lines A to N. The rate of flow of gas is regulated so as to ensure the necessary temperature difference within the heaters of successive lines.

This design concept has been described by way of example. Without thereby departing from the scope of the invention, it would naturally be possible not only to modify the number of stages or lines but, in addition, to juxtapose the different lines, to provide a different design for the stages of the different lines or the high or low-pressure stages of a same line, to replace the heaters and condensers described by direct-contact exchangers, to group together in a single unit the retreatments of the different make-up quantities or the heat-rejection stages and so forth. Similarly, in the case in which reheating is carried out by the gas of a gas-turbine cycle, the heaters of the successive lines can be placed in the gas circuit between the different gas recompression stages.

Figure 2:
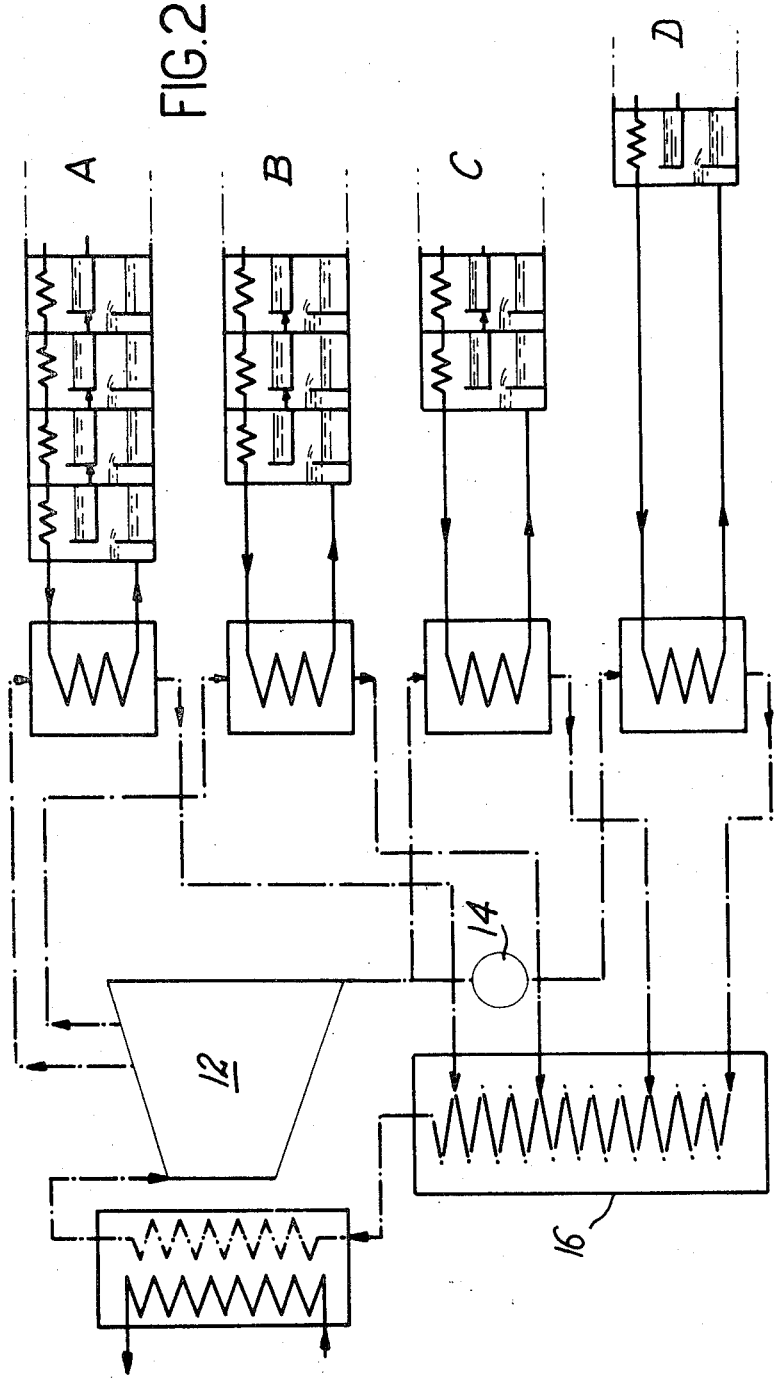

FIG. 2 illustrates a particular variant of the embodiment hereinabove described wherein the desalination plant is coupled with a thermal power station of the steam turbine type. Reheating of the sea water in the heaters of the different successive lines A to D is carried out by steam which is withdrawn at different pressures from the turbine 12. The heater of line A is fed with steam which is withdrawn at the highest pressure and this pressure decreases from one line to the next. The steam which is fed to the heater of line D passes from the outlet of the turbine through an expander-desuperheater 14. The different condensates derived from the outlets of the heaters are recycled at 16 and reinjected into the steam generator in which the water is again heated and vaporized to be returned to the turbine 12.

Figure 3:
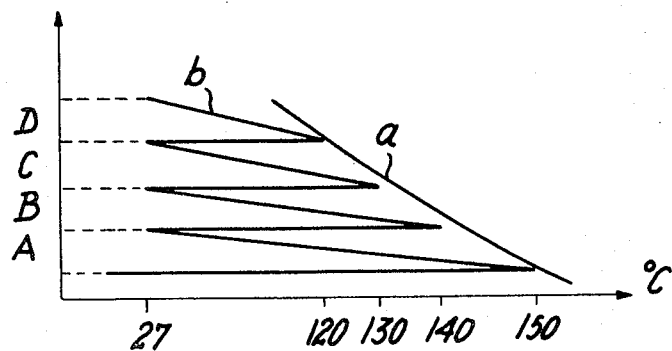
FIG. 3 represents the progressive variation, during the process, of the concentration of scale-forming salts in sea water compared with the curve of solubility of said salts.

By way of example, the different lines comprises in this case:

Line A—46 heat-recovery stages
Line B—39 recovery stages
  3 rejection stages
Line C—35 recovery stages
  3 rejection stages
Line D—31 recovery stages
  3 rejection stages During the treatment in the successive lines, the concentration of the different salts in the sea water increases. The increase in concentration of scale-forming salts and especially of calcium sulphate makes it necessary to reduce the heating temperature of the feed solution from one line to the next in order to prevent said salt from forming a deposit. In fact, the extreme temperature of solubility of calcium sulphate decreases when its concentration in water increases as is shown in FIG. 3 (curve $a$). Progressively as the concentration of the sea water increases, the heating temperature of each line is nevertheless maintained at a maximum value which is compatible with the limit of solubility of calcium sulphate.

Curve $b$ in FIG. 3 shows the progressive variation of concentration of scale-forming salts in the different lines. It is assumed in FIG. 3 that the same temperature of 27° C. is maintained in the last recovery stage of each line; in the four successive lines, the temperature within the heater is respectively 150° C., then 140° C., then 130° C., then, 120° C.

Figure 4:
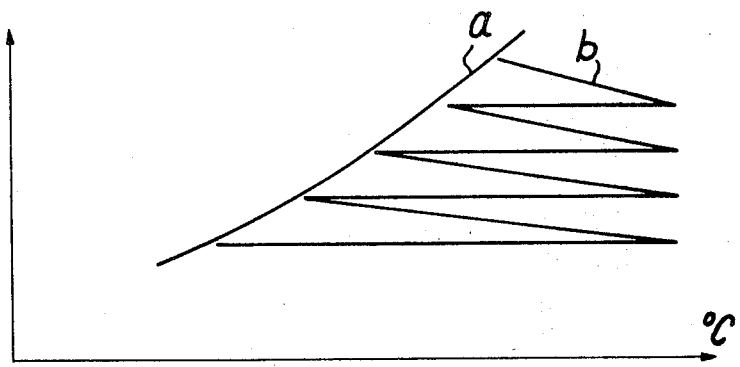
FIG. 4 represents the progressive variation, during the process, in the case of a salt having normal solubility.

In the case of a saline solution having normal solubility, FIG. 4 represents the progressive variation, during the process, of the concentration of salts compared with the curve of solubility of said salts: (a) curve of solubility and (b) progressive variation of the saline concentration in four lines. The maximum temperature of the line is then limited either by technological considerations (excessive vapor pressure) or by chemical considerations (instability at high temperature).

What we claim is:

1. A flash distillation process comprising the steps of distillation of sea water to be treated in a plurality of lines each comprising reheating the sea water in the liquid state forming a preheated solution, causing the expansion of the preheated solution in a series of stages ta progressively decreasing pressures consisting of stages for recovery at higher pressure and stages for heat rejection at lower pressure, causing condensation of the vapor produced at each stage, condensation being caused at least in the recovery stages by exchange with the sea water feed solution prior to reheating as said sea water feed solution circulates from one stage to the next countercurrent to the reheated solution, the feed solution of each line consisting of the non-vaporized solution of the preceding line as completed by a make-up quantity of fresh sea water, the reheating taking place at temperatures which decrease progressively from approximately 150° C., from one line to the next by approximately 10° C. as a function of the increase in in the concentration of a salt having reverse solubility in the reheated solution and substantially the same temperature being maintained in the last recovery stage of each line.

2. A process in accordance with claim 1, including the step of pretreatment of the make-up quantity of fresh sea water of each line to neutralize the action of troublesome constituents.

3. A process in accordance with claim 1, the condensation in the heat-rejection stages taking place by exchange with non-pretreated fresh sea water from which said makeup quantity of fresh sea water is withdrawn.

4. A process in accordance with claim 1, the reheating of the feed solutions of each line being carried out by exchange with a hot fluid which circulates in series from one line to the next.

5. A process in accordance with claim 1, the reheating of the solution in the successive lines being carried out by exchange with steam withdrawn from a single steam turbine at progressively decreasing pressure.

References Cited

UNITED STATES PATENTS

| | | | |
|---|---|---|---|
| 3,152,053 | 10/1964 | Lynam | 203—11X |
| 3,391,062 | 7/1968 | Tidball | 202—173X |
| 3,376,204 | 4/1968 | Tidball | 203—11X |
| 3,476,654 | 11/1969 | Sieder | 159—2X |

NORMAN YUDKOFF, Primary Examiner

D. EDWARDS, Assistant Examiner

U.S. Cl. X.R.

203—88; 202—173; 159—2MS